US010051082B2

(12) United States Patent
Borley et al.

(10) Patent No.: US 10,051,082 B2
(45) Date of Patent: Aug. 14, 2018

(54) COST DETERMINATION TO PROVIDE SOFTWARE AS A SERVICE

(71) Applicant: International Business Machines Corporation, Armonk, NY (US)

(72) Inventors: Andrew J Borley, Pimperne (GB); Callum P. Jackson, Romsey (GB); Kathryn M. McMullan, Chandlers Ford (GB); Philip L. Norton, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 489 days.

(21) Appl. No.: 14/731,670

(22) Filed: Jun. 5, 2015

(65) Prior Publication Data
US 2016/0360009 A1 Dec. 8, 2016

(51) Int. Cl.
G06F 15/16 (2006.01)
H04L 29/08 (2006.01)
H04L 29/06 (2006.01)

(52) U.S. Cl.
CPC .............. *H04L 67/34* (2013.01); *H04L 67/10* (2013.01); *H04L 67/1097* (2013.01); *H04L 67/16* (2013.01); *H04L 67/42* (2013.01); *H04L 67/20* (2013.01)

(58) Field of Classification Search
CPC .......... H04L 67/16; H04L 67/20; H04L 67/34
USPC .................................. 709/202–203, 217–219
See application file for complete search history.

(56) References Cited

U.S. PATENT DOCUMENTS

| | | | |
|---|---|---|---|
| 6,362,836 B1 * | 3/2002 | Shaw | H04L 67/34 709/207 |
| 6,938,007 B1 | 8/2005 | Iulianello et al. | |
| 8,578,348 B2 | 11/2013 | Fliess et al. | |
| 8,799,056 B2 | 8/2014 | Kunjur et al. | |

(Continued)

FOREIGN PATENT DOCUMENTS

WO 2013141859 A1 9/2013

OTHER PUBLICATIONS

Mishra, et al.; "Optimal Service Pricing for Cloud Based Services"; International Journal of Soft Computing and Engineering (IJSCE); ISSN: 2231-2307; vol. 2; Issue-3; Jul. 2012; pp. 531-540.

(Continued)

*Primary Examiner* — Bharat N Barot
(74) *Attorney, Agent, or Firm* — Edward J. Wixted, III

(57) ABSTRACT

A method for use in a computer of generating a cost associated with performing a request for a service using computer software, the method comprising: generating metadata associated with the cost of a plurality of portions of the computer software, the metadata including an identifier associated with each of the plurality of portions of the computer software; embedding at least the identifier into each respective portion of the plurality of portions of the computer software; utilizing the embedded identifier to determine which of the plurality of portions of the computer software are used to perform the request; assigning, using the metadata, a cost to each of the one or more portions of the computer software determined to be used to perform the request; and calculating a total cost associated with usage of the computer software to perform the request.

18 Claims, 9 Drawing Sheets

(56) References Cited

U.S. PATENT DOCUMENTS

| | | | | |
|---|---|---|---|---|
| 8,909,784 B2* | 12/2014 | Ferris | ............... | H04L 67/16 |
| | | | | 709/218 |
| 9,075,788 B1* | 7/2015 | Roth | ............... | H04L 67/16 |
| 2006/0206582 A1* | 9/2006 | Finn | ............... | H04L 63/10 |
| | | | | 709/217 |
| 2009/0187575 A1* | 7/2009 | DaCosta | ............... | G06Q 30/06 |
| | | | | 707/999.01 |
| 2009/0271324 A1 | 10/2009 | Jandhyala et al. | | |
| 2012/0137003 A1* | 5/2012 | Ferris | ............... | H04L 67/16 |
| | | | | 709/226 |
| 2014/0324647 A1 | 10/2014 | Iyoob et al. | | |

OTHER PUBLICATIONS

Zhao, et al.; "Dynamic Pricing and Profit Maximization for the Cloud with Geo-distributed Data Centers"; IEEE; 978-1-4799-3360-0/14; © 2014; pp. 1-9.

"Amazon EC2 Pricing"; Amazon Web Services, Inc.; © 2015; Printed Apr. 29, 2015; pp. 1-18; <http://aws.amazon.com/ec2/pricing/>.

"Lucrative Pricing and Packaging Strategies for the Cloud Today, Tomorrow, and Beyond"; SafeNet; Best Practice Pricing and Packaging Strategies for SaaS Applications Whitepapaer; © 2011 SafeNet, Inc.; pp. 1-11.

Mell et al., "The NIST Definition of Cloud Computing", Recommendations of the National Institute of Standards and Technology, Special Publication 800-145, Sep. 2011, 7 pages.

* cited by examiner

US 10,051,082 B2

COST DETERMINATION TO PROVIDE SOFTWARE AS A SERVICE

BACKGROUND OF THE INVENTION

The present invention relates generally to the field of software as a service (SaaS) and more particularly to determining the monetary cost of providing software as a service in cloud environments.

As cloud computing becomes the primary method for companies to provide services, some software is no longer sold as a product or by license. The monetary cost of providing a software as a service (SaaS) solution to an end-user is difficult to determine and so determining the price to charge the end-user is often inaccurate. Current cost metrics are typically determined using hardware consumption including disk space, processing time and Graphics Processing Unit (GPU) and memory usage. These prices are often static such as Amazon's® EC2 which provides tiered levels of service. Sometimes, a dynamic pricing scheme is used where the cost of the service is determined using analytics. This takes into account factors such as time of day, current load, competitors pricing etc.

When a company provides a service to its users the hardware cost is usually minimal compared to the cost of software engineering. Currently there is no measured way of charging for the monetary cost of investment in the software. One possible solution might be to see what other companies charge for similar services and to base the monetary cost around those charges. However, if a new service is being provided or a significant advantage being offered, then a base price needs to be determined that ensures the monetary cost of the software development and hardware costs are taken into account. For more mature services the monetary cost of servicing and updating the software also needs to be considered.

SUMMARY

According to an embodiment of the invention, a method for use in a computer of generating a cost associated with performing a request for a service using computer software, the method comprises: generating metadata associated with the cost of a plurality of portions of the computer software, the metadata including an identifier associated with each of the plurality of portions of the computer software; embedding at least the identifier into each respective portion of the plurality of portions of the computer software; utilizing the embedded identifier to determine which of the plurality of portions of the computer software are used to perform the request; assigning, using the metadata, a cost to each of the one or more portions of the computer software determined to be used to perform the request; and calculating a total cost associated with usage of the computer software to perform the request.

Embodiments of the invention provide a system of generating a cost associated with performing a request for a service using computer software, the system comprising: an assigner, which generates metadata associated with the cost of a plurality of portions of the computer software, the metadata including an identifier associated with each of the plurality of portions of the computer software and which the assigner embeds into each respective portion of the plurality of portions of the computer software; a retriever, which utilizes the embedded identifier to determine which of the plurality of portions of the computer software were used to perform the request; a matcher, which matches, using the metadata, each of the one or more portions of the computer software determined to be used to perform the request with a cost associated therewith; a price calculator, which calculates a total cost associated with usage of the computer software to perform the request.

Embodiments of the invention also provide a computer program product for generating a cost associated with performing a request for a service using computer software, the computer program product comprising: a computer readable storage medium having program instructions embodied therewith, the program instructions executable by a computer to cause the computer to: generating metadata associated with the cost of a plurality of portions of the computer software, the metadata including an identifier associated with each of the plurality of portions of the computer software; embedding at least the identifier into each respective portion of the plurality of portions of the computer software; utilizing the embedded identifier to determine which of the plurality of portions of the computer software are used to perform the request; assigning, using the metadata, a cost to each of the one or more portions of the computer software determined to be used to perform the request; and calculating a total cost associated with usage of the computer software to perform the request.

DETAILED DESCRIPTION

Figure 1:
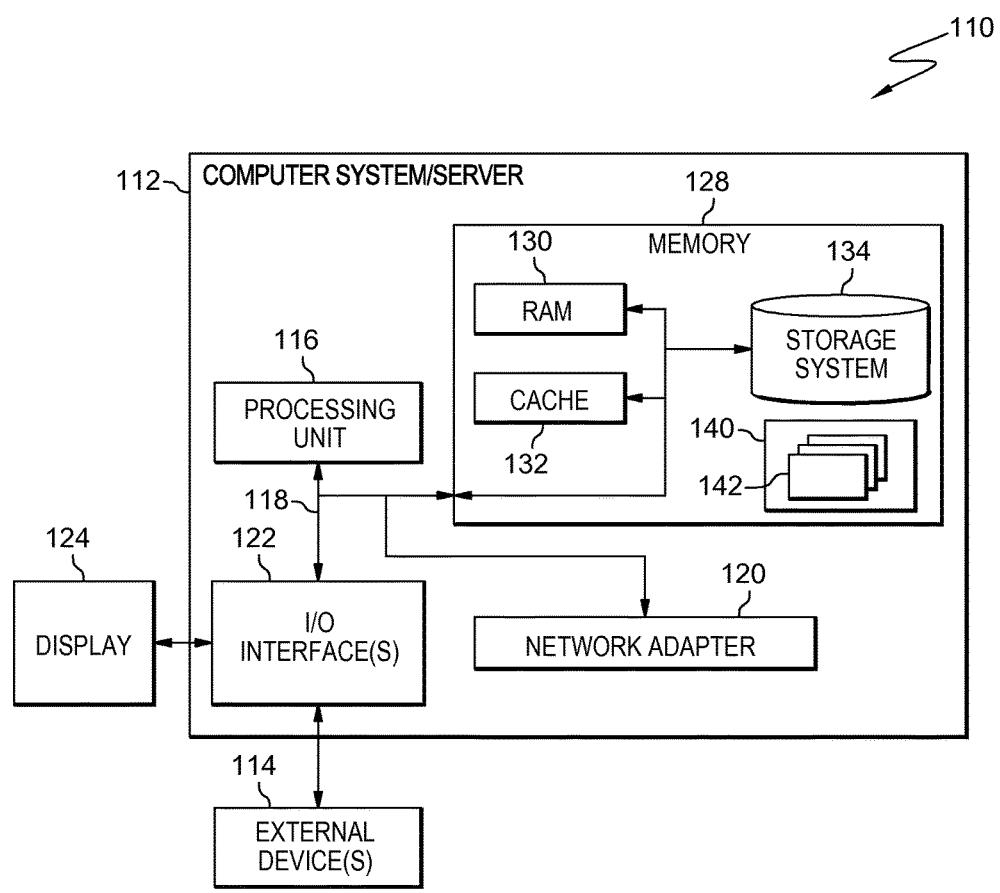
FIG. 1 depicts a cloud computing node according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 110 is only one example of a suitable cloud computing node and is not intended to suggest any limitation as to the scope of use or functionality of embodiments of the invention described herein. Regardless, cloud computing node 110 is capable of being implemented and/or performing any of the functionality set forth hereinabove.

In cloud computing node 110 there is a computer system/server 112, which is operational with numerous other general purpose or special purpose computing system environments or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 112 in cloud computing node 110 is shown in the form of a general-purpose computing device. The components of computer system/server 112 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of computer system readable media. Such media may be any available media that is accessible by computer system/server 112, and it includes both volatile and non-volatile media, removable and non-removable media.

System memory 128 can include computer system readable media in the form of volatile memory, such as random access memory (RAM) 130 and/or cache memory 132. Computer system/server 112 may further include other removable/non-removable, volatile/non-volatile computer system storage media. By way of example only, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 118 by one or more data media interfaces. As will be further depicted and described below, memory 128 may include at least one program product having a set (e.g., at least one) of program modules that are configured to carry out the functions of embodiments of the invention.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of embodiments of the invention as described herein.

Computer system/server 112 may also communicate with one or more external devices 114 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via Input/Output (I/O) interfaces 122. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples, include, but are not limited to: microcode, device drivers, redundant processing units, external disk drive arrays, RAID systems, tape drives, and data archival storage systems, etc.

Figure 2:
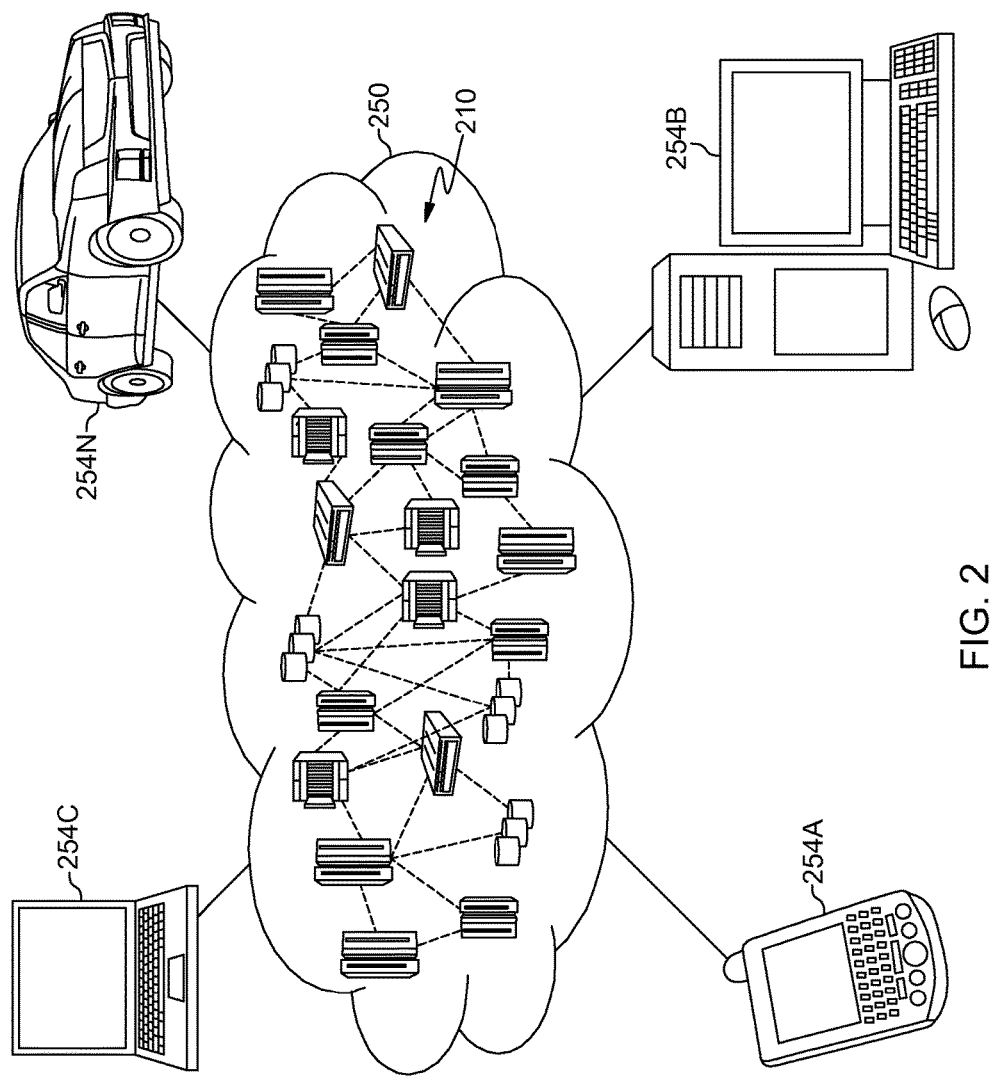
FIG. 2 depicts a cloud computing environment according to an embodiment of the present invention.

Referring now to FIG. 2, illustrative cloud computing environment 250 is depicted. As shown, cloud computing environment 250 comprises one or more cloud computing nodes 210 with which local computing devices used by cloud consumers, such as, for example, personal digital assistant (PDA) or cellular telephone 254A, desktop computer 254B, laptop computer 254C, and/or automobile computer system 254N may communicate. Nodes 210 may communicate with one another. They may be grouped (not shown) physically or virtually, in one or more networks, such as Private, Community, Public, or Hybrid clouds as described hereinabove, or a combination thereof. This allows cloud computing environment 250 to offer infrastructure, platforms and/or software as services for which a cloud consumer does not need to maintain resources on a local computing device. It is understood that the types of computing devices 254A-N shown in FIG. 2 are intended to be illustrative only and that computing nodes 210 and cloud computing environment 250 can communicate with any type of computerized device over any type of network and/or network addressable connection (e.g., using a web browser).

Figure 3:
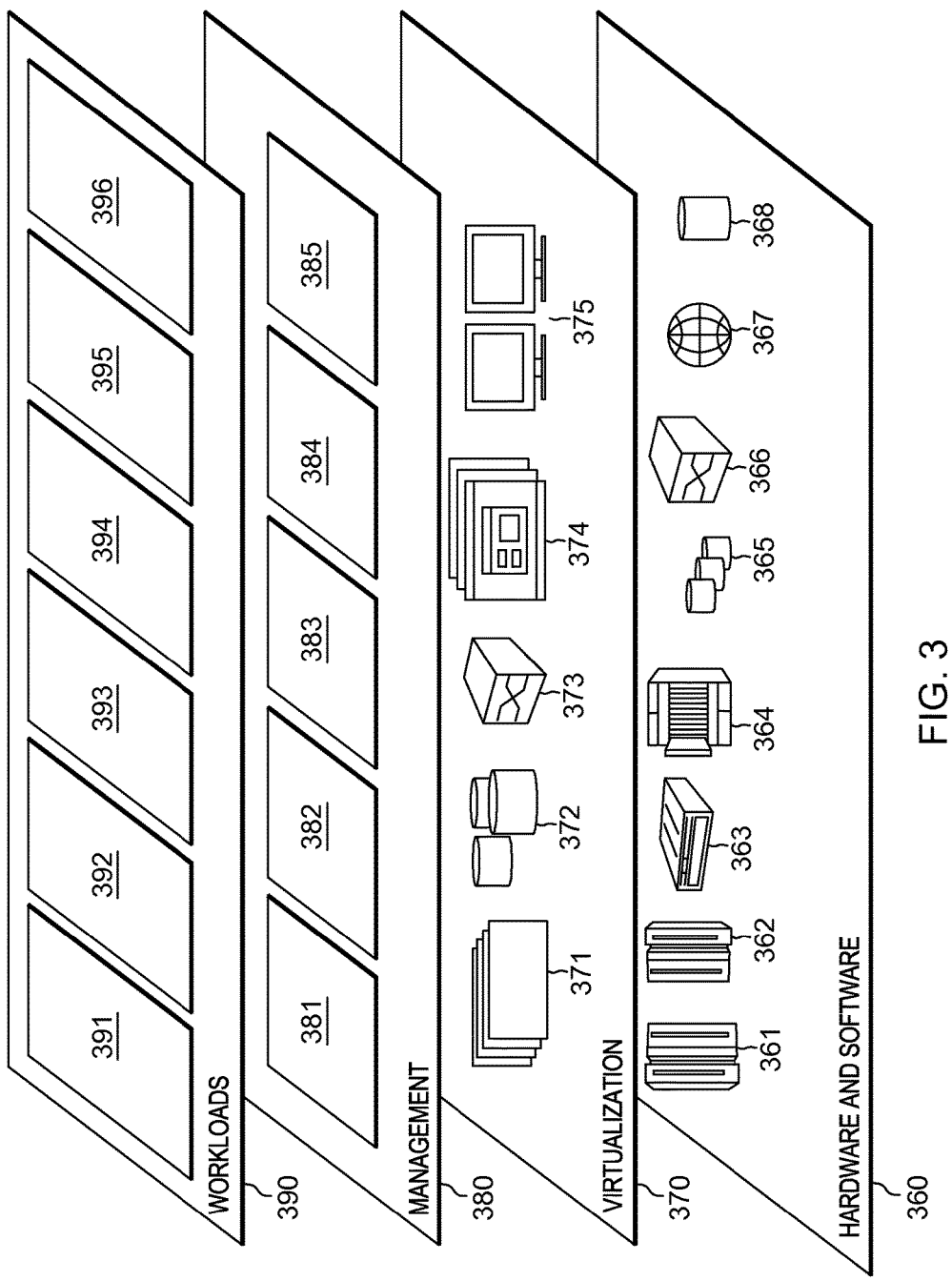
FIG. 3 depicts abstraction model layers according to an embodiment of the present invention.

Referring now to FIG. 3, a set of functional abstraction layers provided by cloud computing environment 250 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 360 includes hardware and software components. Examples of hardware components include: mainframes 361; RISC (Reduced Instruction Set Computer) architecture based servers 362; servers 363; blade servers 364; storage devices 365; and networks and networking components 366. In some embodiments, software components include network application server software 367 and database software 368.

Virtualization layer 370 provides an abstraction layer from which the following examples of virtual entities may be provided: virtual servers 371; virtual storage 372; virtual networks 373, including virtual private networks; virtual applications and operating systems 374; and virtual clients 375.

In one example, management layer 380 may provide the functions described below. Resource provisioning 381 provides dynamic procurement of computing resources and other resources that are utilized to perform tasks within the cloud computing environment. Metering and Pricing 382 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 383 provides access to the cloud computing environment for consumers and system administrators. Service level management 384 provides cloud computing resource allocation and management such that required service levels are met. Service Level Agreement (SLA) planning and fulfillment 385 provide pre-arrangement for, and procurement of, cloud computing resources for which a future requirement is anticipated in accordance with an SLA.

Workloads layer 390 provides examples of functionality for which the cloud computing environment may be utilized. Examples of workloads and functions which may be provided from this layer include: mapping and navigation 391; software development and lifecycle management 392; virtual classroom education delivery 393; data analytics processing 394; transaction processing 395; and cost generation 396. As mentioned above, all of the foregoing examples described with respect to FIG. 3 are illustrative only, and the invention is not limited to these examples.

It is understood all functions of the present invention as described herein are typically performed by a cost generation program, which can be tangibly embodied as program modules 142 of program/utility 140. However, this need not be the case. Rather, the functionality recited herein could be carried out/implemented and/or enabled by any of the layers 360-366 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of clustered computing environment now known or later developed.

Embodiments of the invention provide a means by which the monetary cost of creating software, such as service elements, used in a SaaS offering can be determined. Embodiments of the present invention have the advantage over the existing pricing schemes in that the monetary cost of software engineering can be embedded in the price charged for a service. This charge can be dynamically determined based on the complexity actually used by the end-user. This allows companies to quickly determine the amount of profit being generated by providing such as service.

Embodiments of the invention use the software development process to determine the amount of resources invested in particular features and combine this with complexity recognition to dynamically calculate a monetary cost for a service. The advantage for providers of cloud based services is that it provides a way to calculate a price for SaaS that ensures the company is making a profit on its investments.

Figure 4:
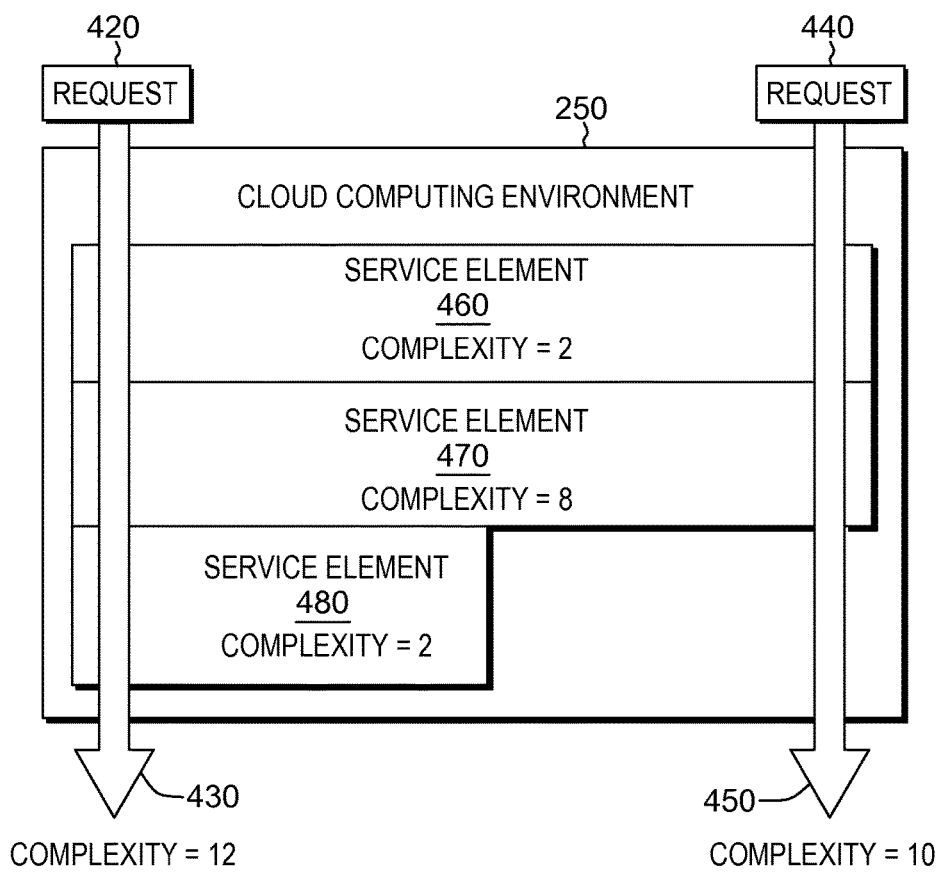
FIG. 4 shows a block diagram of a first flow of two requests through different paths of service elements in a cloud computing environment.

FIG. 4 is a block diagram illustrating the paths of two requests through different service elements of cloud computing environment 250.

In various embodiments, requests such as requests 420 and 440 are submitted by an end-user of the SaaS, such as a customer of a company which provides SaaS and operates cloud computing environment 250. In general, requests describe a specific functionality which the SaaS offering is intended to provide.

In various embodiments, a service element is a specific step or element which must be used by cloud computing environment 250 in order to provide the functionality described in the request. For example, in an example where a customer submits a request such as request 420 for 6,500 email accounts to be provided with 1 GB of storage each, two service elements which the request 420 passes through may be a service element for providing email service, and a service element for 6.5 TB of storage within cloud computing environment 250. Further, in this embodiment, the complexity associated with a service element such as the service element for providing email service is determined based on the amount of resources required to implement the service element. In general, any service or resource required to produce or maintain the functionality described in a request such as request 420 can be included in a service element.

Request 420 is processed by cloud computing environment 250 taking a path 430 through service element 460, service element 470 and service element 480. Each service element 460, 470, 480 has an associated complexity value. In various embodiments, the complexity value associated with a service element is a rough estimate of the amount of time or resources required to implement and maintain the functionality provided by the service element.

Request 420 is associated with a complexity value of 12, this being the sum of the complexities of the service elements 460, 470, 480 through which request 420 has been processed. Request 440 is processed by cloud computing environment 250 taking a path 450 through service element 460, and service element 470. Request 440 is associated with a complexity value of 10, this being the sum of the complexities of the service elements 460 and 470 through which request 440 has been processed. Request 420 has a higher complexity associated with it than does request 440 indicating that it is expected to take a greater amount of time and resources to implement and maintain the functionality described in request 420 than request 440. Embodiments of the invention may operate to generate the cost associated with performing requests for services using computer software when the requests use any number of service elements, or indeed any number of portions of any type of computer software and are not limited to the examples of three service elements and four service elements shown in FIGS. 4 and 5. Embodiments of the invention may also use any measure of complexity and are not limited to the values shown in FIGS. 4 and 5, nor to particular methods of measuring the complexity.

Figure 5:
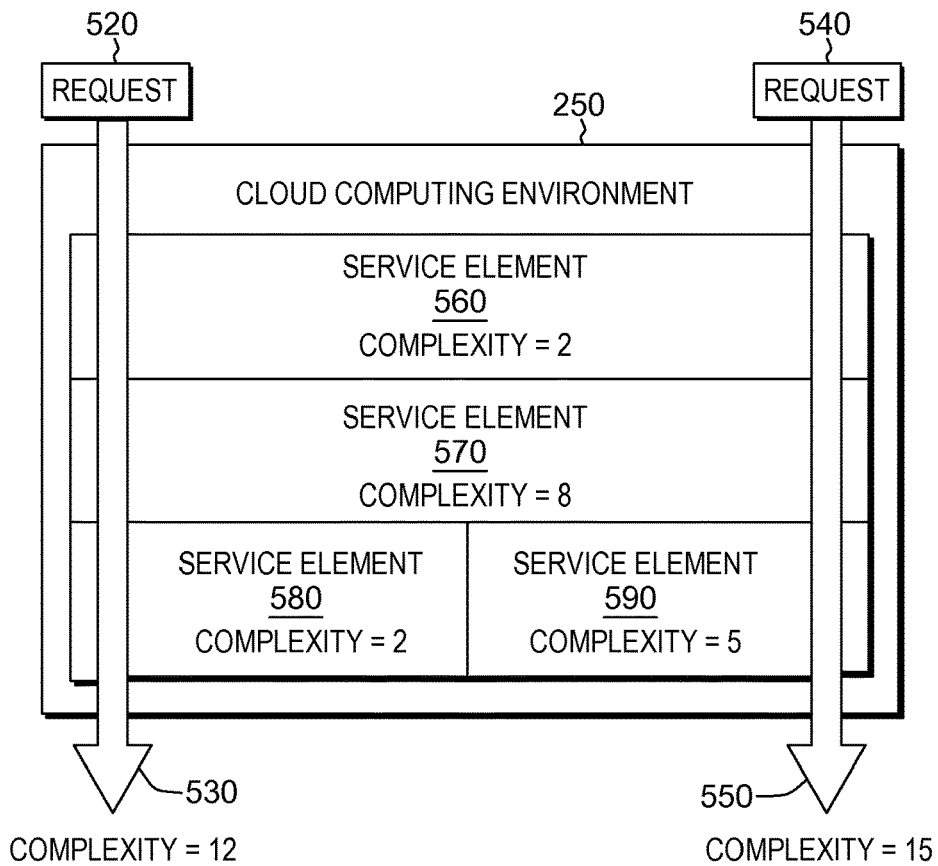
FIG. 5 shows a block diagram of a second flow of two requests through different paths of service elements in a cloud computing environment.

FIG. 5 shows a block diagram of a second flow of two requests through different paths of service elements included within cloud computing environment 250. Request 520 corresponds to a request similar to request 420 of FIG. 4. Request 540 is processed by cloud computing environment 250 taking a path 550 through service element 560, service element 570 and service element 590. Request 540 is associated with a complexity value of 15, this being the sum of the complexities of the service elements 560, 570, and 590 through which request 540 has been processed. Request 520 now has a lower complexity associated with it than does request 540. In FIG. 5, an additional service element 590 has been added to the service elements within cloud computing environment 250. Request 540 causes this new service element 590 to be invoked but request 520 does not. In this example Request 540 would cost more to the end-user than request 520. The new service element 590 added to the service within cloud computing environment 250 has a reasonable amount of complexity (5) associated with it, and hence a significant amount of man power was used to create and maintain it. However it is very efficient on hardware resources and therefore traditional costing models may not have covered the total monetary cost.

Embodiments of the present invention can be used to determine if a service offering or part of a service offering (a particular defect fix or feature) is making a profit and can indicate the exact moment the monetary cost of creating the service has been recovered. In a typical cloud computing environment, the code for each service element is written, tested and delivered to cloud computing environment 250 within hours and minutes rather than weeks and months. With a potentially huge number of changes being pushed to a cloud computing environment 250 in a short time frame it would otherwise be necessary to manually keep track of the changes and calculate the new updated complexity that had been delivered. Calculating the complexity of a request such as requests 420, 440, 520, and 540 must be done on a request by request basis, by tracking the path taken through the code of service elements such as service elements 460, 470, 480,

560, 570, 580, and 590 (whether at component level, class level, method level or line by line) and summing the complexity.

Figure 6:
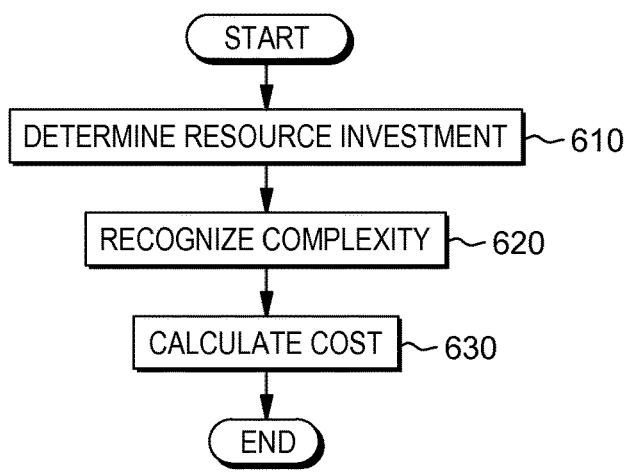
FIG. 6 shows a flow diagram of a method of determining the monetary cost of providing software as a service according to an embodiment of the present invention.

FIG. 6 shows a high level flow diagram of a computer-implemented method of determining the monetary cost of providing SaaS offerings according to an embodiment of the present invention. In step 610, the amount of resources which must be invested to build or operate the SaaS offering is determined by tracking software development metrics. The process included in step 610 is described in greater detail with respect to FIG. 7. In step 620, the complexity of the software as a service which is to be provided is determined. The process included in step 620 is described in greater detail with respect to FIG. 8. In step 630, the costs which are billed to the end-user of the SaaS offering is determined. The process included in step 630 is described in greater detail with respect to FIG. 9. In various embodiments, the operations carried out in these steps may overlap with each other and may be carried out in total, or in part, in the same environment or a different environment from other steps.

Figure 7:
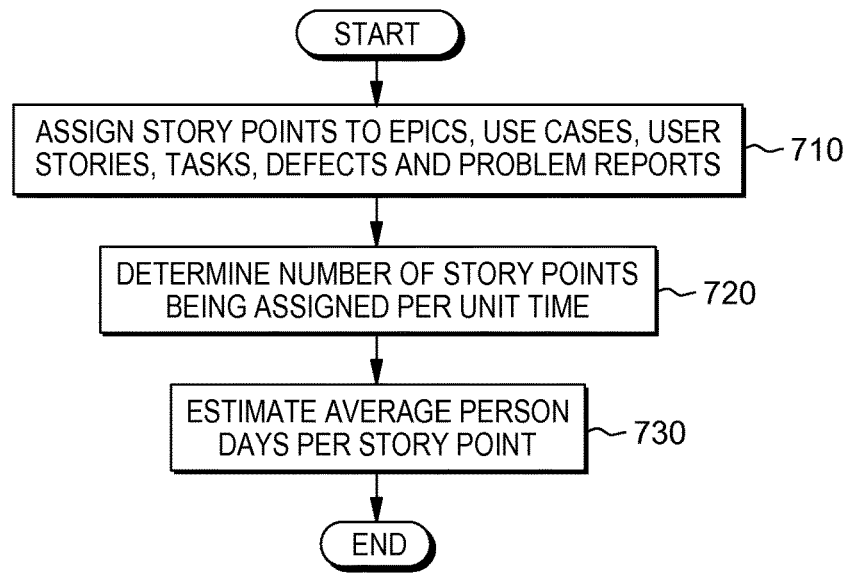
FIG. 7 shows a flow diagram of the determining resource investment step of FIG. 6.

FIG. 7 is a flow diagram of the process included in step 610 of FIG. 6, for determining the resource investment required to build or operate the SaaS offering, in accordance with an embodiment of the invention. In general, the steps of determining resource investment are carried out by the provider of the SaaS offering. In step 710, story points are assigned to each of a plurality of portions of computer software, such as development work items including epics, use cases, user stories, tasks, defects and problem reports. Story points such as story points 1025 are an estimate by the software developers of how much effort is required to complete the task. Story points 1025 are an abstract concept and do not directly map to the number of people or days required to complete the task but rather gives a relative idea of the complexity of the task. The assignment is done on the basis of historical data and experiences of the developers.

In step 720, after the software development process has been running for some time, the average number of story points such as story points 1025 that are being assigned by software developers per unit time is determined. This is known as the velocity of assignment. In one embodiment, story points are determined to be assigned at a rate of ten story points per week. In step 730, the number of story points 1025 assigned per unit time and the number of people working on the SaaS can be used to give an estimate of the average person days required to deliver a story point 1025. This is already common practice when using agile development. The average cost of a story point 1025 to the company developing the SaaS offering can be calculated by using the estimate of the average person days per story point 1025 and the average daily cost of a software developer. Embodiments of the invention are not limited to particular methodologies of calculating the average cost per story point, and in other embodiments other methodologies for calculating the cost of a story point may be used.

Figure 8:
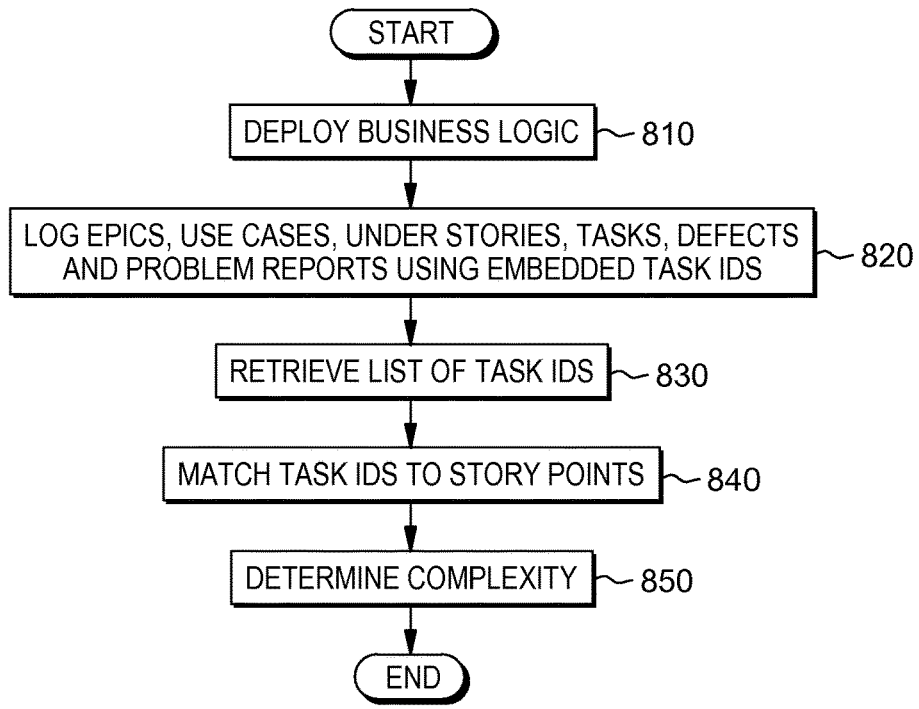
FIG. 8 shows a flow diagram of the complexity recognition step of FIG. 6.

FIG. 8 shows a flow diagram of the process included in step 620 of FIG. 6, for recognizing the complexity of the SaaS offering to be provided. In step 810, a service end-user starts to deploy business logic such as business logic 1110 (see FIG. 11.) to solve a business problem or a set of business problems. Typically, a service end-user will require a SaaS offering which combines together various service elements so as to solve a business problem. The more complex the business logic such as business logic 1110, the more use cases/user stories will be required to produce the required business logic such as business logic 1110. In one embodiment of the invention, a task ID is used to identify a portion of software which was created based on a use case, user story, epic, or another software development tool used to guide development of a portion of software. In these embodiments, the embedded task ID is later used to identify when the portions of software corresponding to these use cases, user stories, or epics are executed. The number of story points which were assigned to the portion of software associated with a given task ID may be used to generate a cost associated with performing a request for a service requiring the use of any number of service elements.

In step 820, the identifiers, such as task IDs, associated with the plurality of portions of computer software, such as epics, use cases, user stories, tasks, defects and problem reports, that are executed by the end-user of the service are logged using the task ID embedded into the service element in step 710 above. The embedded identifier, such as the task ID, is utilized to determine which of the plurality of portions of the computer software are used to perform the request. For example, in one embodiment an end-user of the SaaS offering deploys business logic such as business logic 1110 to track the success of an online marketing campaign and send an email to individuals who purchased a product as a result of the marketing campaign. In this embodiment, a first task IDs corresponding to a use cases for analyzing online marketing campaign data and a second task ID corresponding to a use case for sending an email to a subset of users are logged. In the example of request 420 of FIG. 4, the execution of service elements 460, 470 and 480 as part of request 420 are logged. The complexity values shown in FIG. 4 to illustrate the general environment in which embodiments of the invention operate are not typically logged and are not typically present in the service elements 460, 470, 480 themselves. In the example of request 440 of FIG. 4, the execution of service elements 460 and 470 as part of request 440 are logged. In the example of request 540 of FIG. 5, the execution of service elements 560, 570 and 580 as part of request 540 are logged. As mentioned above, the logging is done using a task ID associated with each of the service elements. In various embodiments of the invention, such logging is completed where the service elements 460, 470, 480, 560, 570, 580, and 590 are executing. In other embodiments, the logging is completed elsewhere, such as a location between the SaaS end-user and the SaaS provider.

In step 830, using monitoring or trace analysis a list of identifiers, such as the task IDs logged in step 820 is retrieved. This retrieval may be done by a retriever (1120 in FIG. 11). Typically, such a retriever executes where the service elements 460, 470, 480, 560, 570, 580, and 590 are executing. In other embodiments, the retrieving is completed elsewhere, such as a location between the SaaS end-user and the SaaS provider. The retriever 1120 retrieves the task IDs (1070-1095 in FIG. 11) from where they were logged during execution of the service element. Such retrieval may take place as the execution of each request completes or it may be batched so that a specified number of requests complete before any retrieval is performed. The retriever 1120 sends the information about which task IDs associated with a service element were logged as the service element was executed to the provider of the SaaS. Such sending may take place as each request such as requests 420, 440, 520, and 540 completes or it may be batched so that a specified number of requests complete before any sending is completed. If retrieval takes place as each request completes, sending may take place as each request completes or sending may be batched.

In step 840, the retrieved identifiers, such as task ids 1070-1095, are matched to their respective story points 1025 using monitoring or trace analysis. In one embodiment, this matching is done by a matcher (1130 in FIG. 11). The matcher 1130 receives the information about which of the task IDs 1070-1095 associated with the service elements 460, 470, 480, 560, 570, 580, and 590 were executed. The matcher 1130 requests from a software configuration management system (1020 in FIG. 11) the number of story points 1025 associated with each task ID 1070-1095. In one embodiment of the invention, matcher 1130 executes within SaaS provider 1010 where it has access to the story point 1025 information stored in the software configuration management system 1020.

In step 850, the complexity is then determined at the scope required, by measuring the number of story points 1025 triggered, for example, per request processed, per day, per month and the like. This determination may be done by a determiner (1140 in FIG. 11). Typically, such a determiner 1140 executes within SaaS provider 1010 where it has access to the story point 1025 information and the task ids 1070-1095 provided by the matcher 1130. By determining which task IDs 1070-1095 were executed and how many story points 1025 are associated with each executed task ID 1070-1095, a total number of story points 1025 triggered during execution of each service element can be determined. This means that a cost can be assigned, using the metadata, such as the identifier, to each of the one or more portions of the computer software determined to be used to perform the request.

Figure 9:
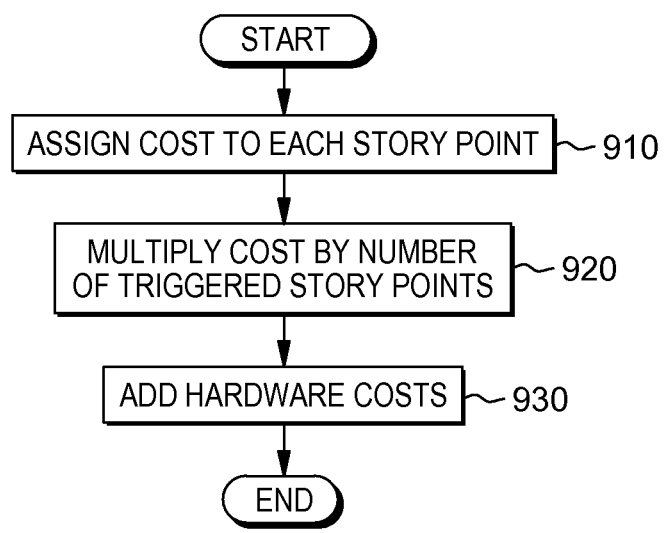
FIG. 9 shows a flow diagram of the price calculation step of FIG. 6.

FIG. 9 shows a flow diagram of the process of step 630 of FIG. 6, for calculating the price. In step 910, using the complexity in story points 1025 calculated at step 850 above, the monetary cost incurred by the user of the SaaS is determined by assigning a monetary cost to each story point 1025. In various embodiments, the value of a story point is determined based on the amount of story points which can be produced by a software developer over a given period of time, and the cost of a software developer over the given period of time. In step 920, the monetary cost assigned to each story point 1025 is multiplied by the number of triggered story points, the number of triggered story points representing the complexity of the portions of computer software which are used. This means that a total cost associated with usage of said computer software to perform a request can be calculated. In step 930, the hardware costs of executing one or more of the plurality of portions of the computer software incurred are added using prior art techniques to calculate a total cost. The price calculation is typically completed by a price calculator (1150 in FIG. 11). Such a price calculator 1150 executes at the SaaS provider 1010 where it has access to the information stored in the software configuration management system 1020 about the cost of each story point 1025. It may be completed elsewhere, provided it is able to obtain the information from the determiner 1140 as to the number of story points 1025 triggered and the information about the cost of each story point 1025, which may be sensitive commercial information.

The total monetary cost calculated at step 930 may be used in more complex algorithms to refine a determination of the predicted profit based on the expected life span of the service, number of customers, average complexity and the like. This method of calculating the real cost of a service is flexible and fits well with existing SaaS pricing models such as a 'Feature-Limited Pricing' model which gives low cost entry with limited features and charges for upgrade to more feature rich services or the 'Pay-as-you-grow' model where customers only pay for the features they use. Using this technique the development cost of new features can be more accurately reflected in these models.

Over time the SaaS will require servicing to fix any problems found. Any fixes made or problem reports handled may be treated in the same way as any other task, and assigned story points 1025 depending on its complexity. These may then be tracked and used to refine the price of providing the SaaS. The resource investment and complexity recognition may also be used in the calculation of a customer refund if service availability does not meet the Service Level Agreement (SLA).

Figure 10:
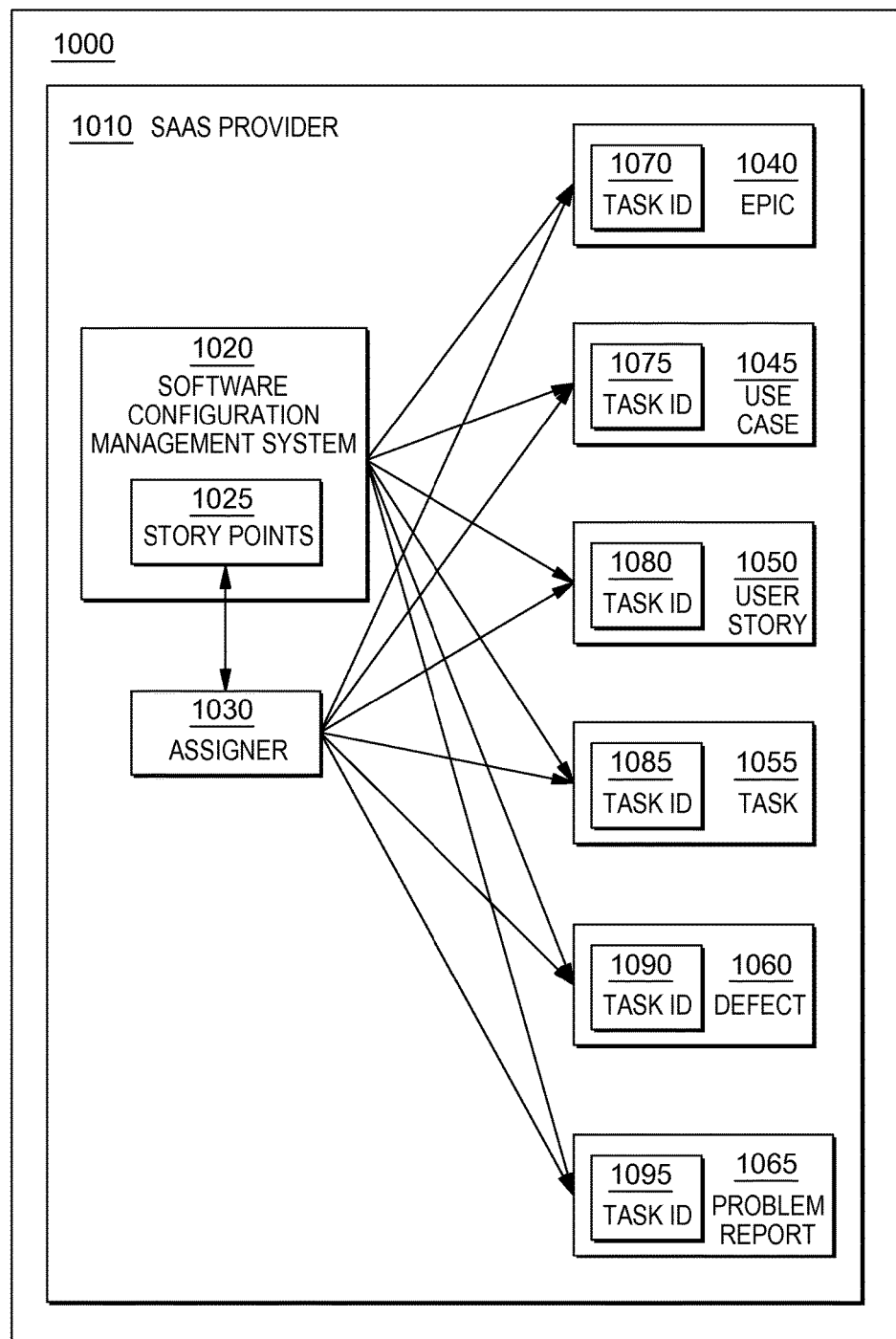
FIG. 10 shows a block diagram of a software as a service provider portion of a system of determining the monetary cost of providing software as a service according to embodiments of the present invention.

FIG. 10 shows a block diagram of a SaaS provider 1010 of a system 1000 for determining the monetary cost of providing SaaS according to embodiments of the invention. Assigner 1030, which may be part of a software configuration management system 1020, assigns story points 1025 to development work items such as epics 1040, use cases 1045, user stories 1050, tasks 1055, defects 1060, and problem reports 1065. In general, story points are assigned based on an estimate by the software developers of how much effort is required to complete each of these items. In various embodiments, story points represent an abstract concept and do not directly map to the number of people or days required to complete the task but rather gives a relative idea of complexity. Assigner 1030 also embeds the task ID 1070-1095 associated with the development work item into the computer program code for the development work item. In the example of FIG. 10, task ID 1070 is embedded into epic 1040, task ID 1085 is embedded into task 1055, task ID 1090 is embedded into defect 1060, task ID 1095 is embedded into problem report 1065, task ID 1075 is embedded into use case 1045 and task ID 1080 is embedded into user story 1050.

Assigner 1030, after the software development process has been running for some time, determines a velocity, which indicates the average number of story points 1025 that are being delivered per unit of time. The number of story points 1025 delivered per unit of time and the number of people working on the SaaS can be used to give an estimate of average person days required to deliver a story point 1025. This is already common practice when using agile development. The average cost of a story point 1025 to the company can be calculated by using the estimate of the average person days per story point 1025 and the average daily cost of a software developer.

In embodiments of the invention, software configuration management system 1020 is a system which tracks and/or controls changes and/or development in portions of computer software. For the purposes of step 704, embodiments of the present invention use such a software configuration management system 1020 to assign story points 1025 to portions of computer software.

Each portion of computer software, such as development work item including epics, use cases, user stories, tasks, defects and problem reports 1040-1065 has an identifier, such as a task id 1070-1095, associated with it. Typically, such identifiers are assigned to each portion of computer software by a software configuration management system (1020 in FIG. 10). Software configuration management system 1020 generates metadata associated with the cost of a plurality of portions of the computer software, the metadata including the identifier associated with each of said plurality of portions of said computer software. For items such as epics, use cases and user stories 1040-1055, the task id 1070-1085 is associated with the computer program code that forms the epic, use case or user story 1040-1055. For items such as defects and problem reports 1060-1065, the task id 1090-1095 may be associated with a particular portion of computer code that is associated with resolving the defect 1060 or the problem that was the subject of the problem report 1065. The particular portion of computer code and its associated task id 1070-1095 may form part of an epic, use case or user story 1040-1050 that also has its own task id 1070-1080. The identifiers, such as task ids 1070-1095, associated with each development work item 1040-1065 are embedded into the computer program code for each of the development work items. Task ids 1070-1095 may be managed by a software configuration management system 1020. The metadata may also include other information relating to any aspect of determining the monetary cost associated with usage of the portions of computer software.

A use case 1045 is a sequence of actions that provide a measurable value to the user. A user story 1050, which is a subset of a use case 1045, is one or more sentences in the everyday or business language of the end user or user of a computing system that captures what a user does or needs to do as part of his or her job function. User stories 1050 are used with agile software development methodologies as the basis for defining the functions a computing system must provide, and to facilitate requirements management. It captures the 'who', 'what' and 'why' of a requirement in a simple, concise way, often limited in detail by what can be hand-written on a small paper notecard.

An epic 1040 is when a user story 1050 comprises too many unknowns to tell just how big the epic 1040 is, or when the user story's 1050 requirements are known, but the development effort associated with it is too large to complete in a single sprint. If an item require more than a quarter of a sprint to complete, it's probably an epic 1040. Estimating epics 1040 can be harmful because it creates a false sense of certainty. Instead, epics 1040 should be split. A sprint is a period of time, typically 30 days, but can be one, two or three weeks.

A task 1055 is a piece of work that needs to be completed. A defect 1060 is a bug or a problem in service logic code. A problem report 1065 is a request associated with any technical product issue that an end-user of the service elements 460, 470, 480, 580 reports. A story point 1025 is an estimate of the effort required to complete a user story 1050. Story points 1025 represent a size-based, complexity-based approach to estimation. Story points 1025 are assigned in whole numbers (1, 2, 3, and so on with no fractions or decimals) and represent relative sizes and complexity of work items 1040-1065. Small and simple tasks are one point tasks, slightly larger/more complex tasks are two point tasks, and so on.

Figure 11:
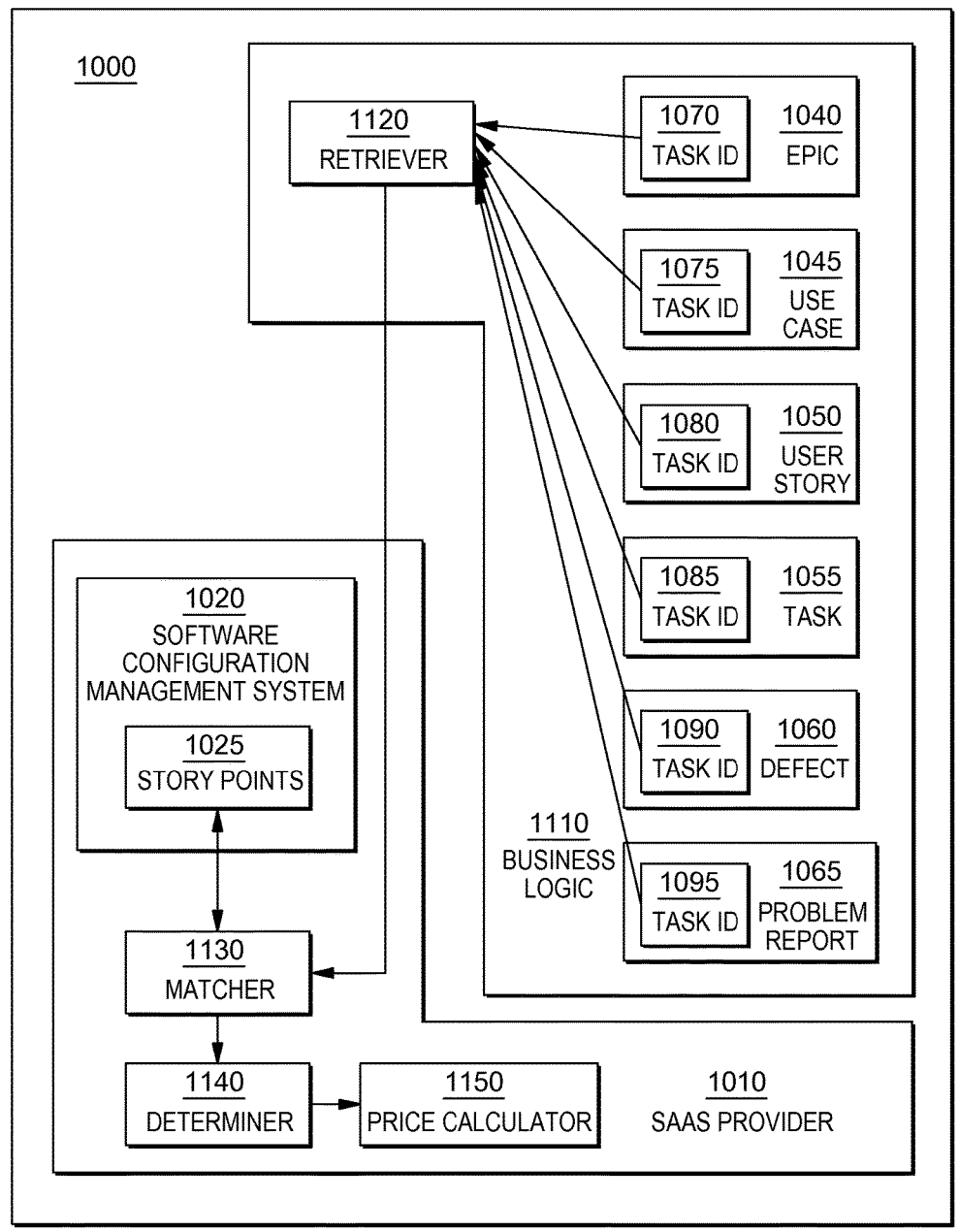
FIG. 11 shows a block diagram of a business logic portion of a system of determining the monetary cost of providing software as a service according to embodiments of the present invention for use with the software as a service provider portion of FIG. 10.

FIG. 11 shows a block diagram of a business logic portion 1110 of a system 1000 for determining the monetary cost of providing SaaS according to embodiments of the invention for use with the SaaS provider 1010 of FIG. 10. Retriever 1120 retrieves which of the development work items are executed as part of requests 420, 440, 520, and 540 by using the embedded task ids 1070-1095 in the development work items such as epic, task, defect, problem report, use case and user story 1040-1065. Retriever 1120 retrieves this information using information logged during monitoring or trace analysis. Retriever 1120 may retrieve this information as each request 420, 440, 520, and 540 completes or retriever 1120 may batch the retrieval so that a number of requests complete before any retrieval is completed. Retriever 1120 sends the information about which task IDs 1070-1095 associated with the development work items were logged as the development work items were executed to the SaaS provider 1010. Such sending may take place as each request 420, 440, 520, and 540 completes or it may be batched so that a number of requests complete before any sending is completed. If retrieval takes place as each request0 completes, sending may take place as each request completes or sending may be batched.

Matcher 1130 also uses monitoring or trace analysis to match the task IDs 1070-1095 to their story points 1025. It receives the task IDs 1070-1095 from retriever 1120 in business logic 1110 and it requests from the software configuration management system 1020 the number of story points 1025 associated with each task id 1070-1095. Determiner 1140 receives from matcher 1130 the task IDs 1070-1095 and the corresponding numbers of story points 1025. Determiner 1140 then determines the complexity at the scope required, by measuring the number of story points 1025 triggered, for example, per request processed, per day, per month.

Price calculator 1150 uses the complexity in story points 1025 calculated by determiner 1140 to calculate the cost incurred by the user of the SaaS, by assigning a cost to each story point 1025. In one embodiment, the cost assigned to each story point 1025 is multiplied by the number of triggered story points 1025. Hardware costs incurred are added using prior art techniques to calculate a total cost.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of generating a cost associated with performing a request for a service, the method comprising:
    generating, by one or more processors, metadata associated with a cost of a first portion of computer software, wherein the metadata includes an identifier associated with the first portion of the computer software;
    embedding, by one or more processors, at least the identifier into the first portion of computer software;
    utilizing, by one or more processors, the embedded identifier to determine at least two portions of the plurality of portions of the computer software that are used to process a request;
    assigning, by one or more processors, using the metadata, a cost to each of the at least two portions of the plurality of portions of the computer software that are used to process the request; and
    calculating, by one or more processors, a total cost associated with usage of the at least two portions of the plurality of portions of the computer software to process the request based on the assigned costs.

2. The method of claim 1, wherein generating metadata associated with a cost of a portion of a plurality of portions of computer software comprises the steps of:
    assigning an identifier to each portion of the plurality of portions of the computer software;
    assigning one or more story points to each portion of the plurality of portions of the computer software, wherein story points represent a cost associated with each of the one or more portions of the computer software;
    determining the number of story points being completed per unit time; and
    estimating the average number of days required for one person to complete a story point.

3. The method of claim 1, wherein the portions of the computer software include epics, use cases, user stories, tasks, defects and problem reports.

4. The method of claim 2, wherein utilizing the embedded identifier to determine at least two portions of the plurality of portions of the computer software that are used to process a request comprises:
    logging identifiers of each portion of the plurality of portions of the computer software which are used;
    retrieving the identifiers;
    matching the retrieved identifiers to one or more story points; and
    determining the number of story points associated with each portion of the plurality of portions of the computer software which are used to perform the request.

5. The method of claim 4, wherein calculating a total cost comprises:
    requesting a cost associated with each story point; and
    multiplying the cost associated with each story point by the number of story points associated with each portion of the plurality of portions of the computer software which are used.

6. The method of claim 5, further comprising adding hardware costs of executing the at least two portions of the plurality of portions of the computer software.

7. A computer program product for generating a cost associated with performing a request for a service, the computer program product comprising:
    one or more computer readable storage media, wherein the one or more computer readable storage media is not a transitory signal per se, and program instructions stored on the one or more computer readable storage media, the program instructions comprising:
    program instructions to generate metadata associated with a cost of a first portion of a plurality of portions of computer software, wherein the metadata includes an identifier associated with the first portion of the computer software;
    program instructions to embed at least the identifier into the first portion of computer software;
    program instructions to utilize the embedded identifier to determine at least two portions of the plurality of portions of the computer software that are used to process a request;
    program instructions to assign, using the metadata, a cost to each of the at least two portions of the plurality of portions of the computer software that are used to process the request; and
    program instructions to calculate a total cost associated with usage of the at least two portions of the plurality of portions of the computer software to process the request based on the assigned costs.

8. The computer program product of claim 7, wherein program instructions to generate metadata associated with a cost of a portion of a plurality of portions of computer software comprise:
    program instructions to assign an identifier to each portion of the plurality of portions of the computer software;
    program instructions to assign one or more story points to each portion of the plurality of portions of the computer software, wherein story points represent a cost associated with each of the one or more portions of the computer software;
    program instructions to determine the number of story points being completed per unit time; and
    program instructions to estimate the average number of days required for one person to complete a story point.

9. The computer program product of claim 7, wherein the portions of the computer software include epics, use cases, user stories, tasks, defects and problem reports.

10. The computer program product of claim 8, wherein program instructions to utilize the embedded identifier to determine at least two portions of the plurality of portions of the computer software that are used to process a request comprise:
    program instructions to log identifiers of each portion of the plurality of portions of the computer software which are used;
    program instructions to retrieve the identifiers;
    program instructions to match the retrieved identifiers to one or more story points; and
    program instructions to determine the number of story points associated with each portion of the plurality of portions of the computer software which are used to perform the request.

11. The computer program product of claim 10, wherein program instructions to calculate a total cost associated with usage of the computer software to perform the request comprise:
    program instructions to request a cost associated with each story point; and
    program instructions to multiply the cost associated with each story point by the number of story points associated with each portion of the plurality of portions of the computer software which are used.

12. The computer program product of claim 11, further comprising program instructions to add hardware costs of executing the at least two portions of the plurality of portions of the computer software.

13. A computer system for generating a cost associated with performing a request for a service, the computer system comprising:
    one or more computer processors, one or more computer readable storage media, and program instructions stored on the computer readable storage media for execution by at least one of the one or more processors, the program instructions comprising:
    program instructions to generate metadata associated with a cost of a first portion of a plurality of portions of computer software, wherein the metadata includes an identifier associated with the first portion of the computer software;
    program instructions to embed at least the identifier into the first portion of computer software;
    program instructions to utilize the embedded identifier to determine at least two portions of the plurality of portions of the computer software that are used to process a request;
    program instructions to assign, using the metadata, a cost to each of the at least two portions of the plurality of portions of the computer software that are used to process the request; and
    program instructions to calculate a total cost associated with usage of the at least two portions of the plurality of portions of the computer software to process the request based on the assigned costs.

14. The computer system of claim 13, wherein program instructions to generate metadata associated with a cost of a portion of a plurality of portions of computer software comprises:
    program instructions to assign an identifier to each portion of the plurality of portions of the computer software;
    program instructions to assign one or more story points to each portion of the plurality of portions of the computer software, wherein story points represent a cost associated with each of the one or more portions of the computer software;
program instructions to determine the number of story points being completed per unit time; and
program instructions to estimate the average number of days required for one person to complete a story point.

15. The computer system of claim 13, wherein the portions of the computer software include epics, use cases, user stories, tasks, defects and problem reports.

16. The computer system of claim 14, wherein program instructions to utilize the embedded identifier to determine at least two portions of the plurality of portions of the computer software that are used to process a request comprise:
program instructions to log identifiers of each portion of the plurality of portions of the computer software which are used;
program instructions to retrieve the identifiers;
program instructions to match the retrieved identifiers to one or more story points; and
program instructions to determine the number of story points associated with each portion of the plurality of portions of the computer software which are used to perform the request.

17. The computer system of claim 16, wherein program instructions to calculate a total cost associated with usage of the computer software to perform the request comprise:
program instructions to request a cost associated with each story point; and
program instructions to multiply the cost associated with each story point by the number of story points associated with each portion of the plurality of portions of the computer software which are used.

18. The computer system of claim 17, further comprising program instructions to add hardware costs of executing the at least two portions of the plurality of portions of the computer software.

* * * * *